(12) United States Patent
Curtis et al.

(10) Patent No.: US 6,674,555 B1
(45) Date of Patent: Jan. 6, 2004

(54) METHOD AND APPARATUS FOR HOLOGRAPHIC DATA STORAGE

(75) Inventors: Kevin Richard Curtis, New Providence, NJ (US); Partha Pratim Mitra, Jersey City, NJ (US); Michael C. Tackitt, Califon, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/599,686

(22) Filed: Jun. 22, 2000

Related U.S. Application Data

(62) Division of application No. 09/113,634, filed on Jul. 10, 1998, now Pat. No. 6,163,391.

(51) Int. Cl.⁷ .............................. G03H 1/08; G03H 1/00
(52) U.S. Cl. .............................. 359/29; 359/30; 359/35; 359/22
(58) Field of Search .............................. 359/29, 30, 35, 359/22, 15, 11

(56) References Cited

U.S. PATENT DOCUMENTS

| | | | |
|---|---|---|---|
| 3,604,778 A | 9/1971 | Burkhardt | 350/3.5 |
| 3,619,022 A | 11/1971 | Hirsch et al. | 350/3.5 |
| 3,716,286 A | 2/1973 | St. John et al. | 350/3.5 |
| 3,744,871 A | 7/1973 | Takeda et al. | 350/3.5 |
| 3,751,132 A | 8/1973 | Croh | 359/3.5 |
| 3,829,193 A | 8/1974 | Tsunoda et al. | 350/3.5 |
| 3,838,904 A | 10/1974 | Takeda et al. | 350/3.5 |
| 3,917,380 A | 11/1975 | Kato et al. | 350/3.5 |
| 4,033,665 A * | 7/1977 | Firester | 359/29 |
| 4,037,918 A * | 7/1977 | Kato | 359/29 |
| 6,018,402 A * | 1/2000 | Campbell et al. | 359/22 |

OTHER PUBLICATIONS

Pu, A. "Holographic 3–D Disks and Optical Correlators Using Photopolymer Materials," Doctoral Dissertation, Demetri Psaltis, Thesis Advisor, California Institute of Tech. pp 119–123 (1997).
Burckhardt, C.B. "Use of a random Phase Mask for the Recording of Fourier Transform Holograms of Data Masks", *Applied Optics* vol. 9, No. 3, pp. 695–700.

* cited by examiner

*Primary Examiner*—Audrey Chang

(57) ABSTRACT

Apparatus for holographic recording of information includes a lens or lens system, referred to here as the "FT lens," situated in such a way that light from an object beam enters the FT lens after passing through an object, and light leaving the FT lens impinges on a recording medium situated at a Fourier transform plane of the object with respect to the FT lens. Disclosed apparatus includes a phase element effectively juxtaposed with the object, in which the phase element is effective for redistributing object-beam intensity in the Fourier transform plane, and the phase element has a correlation length greater than a maximum pixel side length associated with the object. Disclosed apparatus includes an optical element or optical system, referred to here as a "power optic," that adds convergence or divergence to the object beam before the object beam enters the FT lens.

26 Claims, 5 Drawing Sheets

HOLOGRAM PLANE
(FT PLANE)

METHOD AND APPARATUS FOR HOLOGRAPHIC DATA STORAGE

This is a divisional of application Ser. No. 09/113,634, filed on Jul. 10, 1998 now U.S. Pat. No. 6,163,391.

FIELD OF THE INVENTION

This invention relates to the holographic storage of information. More particularly, the invention relates to methods in which information associated with a patterned object is recorded in the form of a Fourier transform hologram.

BACKGROUND OF THE INVENTION

It has long been known that the methods of holography can be used to create records of digital data. For example, data are initially provided in the form of a two-dimensional array of elements such as spots or rectangular pixels. Each of the individual data elements can assume a binary value of 1 or 0 or represent several bits by encoding the light intensity (gray scale) transmitted through the optical system. For example, a totally opaque element may represent 0, whereas a totally transparent element may represent 1. An array of this kind has been referred to as a data mask.

The technique of Fourier transform holography relies on the physical principle that when an object is placed in the front focal plane of a converging lens, the optical field at the back focal plane corresponds to the Fourier transform of that object. (More generally, shifting the object out of the front focal plane of the lens will simply add phase terms to the Fourier transform observed at or near the back focal plane.)

The Fourier transform is a representation of the spatial characteristics of the object. Like an optical image, the Fourier transform has an amplitude that varies meaningfully from place to place. However, the amplitude at a given location in the Fourier transform does not correspond directly to, e.g., the luminance of the object at a given point (as would be the case in an image). Instead, each small region of the Fourier transform receives contributions from essentially every point on the object. As a result of the manner in which these contributions are combined, the amplitude in a given small region expresses the relative contribution that a given spatial frequency makes to the overall pattern represented by the object. Each place within the Fourier transform relates to a corresponding spatial frequency. In this sense, a record of the Fourier transform provides a spatial frequency spectrum of the object.

The Fourier transform may be recorded by placing a suitable recording medium in the back focal plane of the transforming lens. The earliest such media were photographic plates. In addition to photographic media, which are still in use, currently available media include photopolymers, as well as photochromic, photorefractive, and thermoplastic media.

The recording takes place by forming an interference pattern that impinges on the recording medium. Two light beams, referred to as the object beam and the reference beam, are used to form this interference pattern. In order to interfere, these beams must be at least partially coherent, that is, they must be at least partially correlated in phase. In many cases, these beams are generated by passing a single laser beam through a beam splitter.

An illustrative recording setup using a transmissive data mask is shown in FIG. 1. Object beam 05 is created by modulating a plane wave by data mask 10, which is, e.g., a spatial light modulator (SLM). Modulation may be transmissive, as shown, or alternatively, it may be reflective. The object beam then passes through transforming lenses 15, 20, and 25, and impinges on storage medium 30. In a typical arrangement, the lenses are spaced in a standard 4F configuration. (In such a configuration, the spacing between adjacent lenses is equal to the sum of their respective focal lengths. The spacing between a lens and an adjacent element such as data mask 10 is one focal length of that lens.) Reference beam 35 does not pass through the data mask or the system of transforming lenses, but instead is combined directly with object beam 05 on storage medium 30 to form the interference pattern that is recorded as a hologram. The object and reference beams overlap in region 40 of medium 30.

An image of the original object is reconstructed by impinging on medium 30 an excitation beam having the same angle of incidence, wavelength, or wavefront (or combination of these properties) as the reference beam used to create the hologram. Diffraction of the excitation beam by the hologram gives rise to a further, reconstructed output beam 45 that is Fourier transformed by the system of lenses 50, 55, 60 to produce the image. For automatic reading of data, the image is usefully projected onto an array of sensors 65. Such an array is readily provided as, for example, a CCD array or a CMOS optical sensor array.

One practical difficulty posed by photographic emulsions and other holographic media is that none of these exhibit a perfectly linear dynamic range. That is, the optical density of the exposed medium will be proportional to the exposure for only a limited range of exposures. In addition, diffraction efficiency even in a perfect material varies with a figure of merit referred to as the modulation depth. The modulation depth at a given location within the recording medium is the intensity ratio of the object beam to the reference beam at that location.

Practitioners have observed that when the Fourier transform of an object is recorded holographically, as described here, the exposure in significant parts of the hologram that are displaced from the optical axis often tends to be much weaker in intensity than parts lying at or near the optical axis.

This occurs because in the Fourier transform plane, a significant fraction of the total illumination tends to be concentrated in a relatively small spot about the optical axis. This spot corresponds to those few spatial frequencies (generally zero and low-valued frequencies) that are highly represented in any data mask, including data masks that are inherently random in amplitude. We refer to this spot as the "dc spot", in analogy to direct electrical current (dc), which has only a zero frequency component.

If the reference beam is adjusted to match the high intensity of the dc spot, the higher frequencies will have much less diffraction efficiency relative to the low frequencies. Conversely, if the reference beam is adjusted to match the lower intensity present in the higher frequency area of the object beam, the lower frequencies will have much less diffraction efficiency relative to the high frequencies. When the diffraction efficiency is distorted in this way, the reconstructed image will be a corrupted representation of the original object, and as a result, incorrect bit values may be retrieved from the stored data. In addition, this modulation mismatch causes the resulting hologram to have a lower overall diffraction efficiency. Given a fixed amount of laser power, such a reduction in overall diffraction efficiency decreases the attainable read-out rate of the hologram, and thus it limits the rate at which data can be transferred out of a storage device incorporating the hologram.

Various attempts have been made to alleviate this problem. These attempts have been based on the principle that what defines a pattern (for purposes of visual observation or detection by photosensors) is its corresponding pattern of luminous intensity, not its complex amplitude. What distinguishes these quantities (for simplicity of presentation, polarization is here neglected) is that the field quantity described by complex amplitude has both magnitude and phase, and is thus conveniently represented as a complex number, whereas intensity is represented by the (phaseless) real number obtained by multiplying the corresponding amplitude by its complex conjugate: $I=A^* \cdot A$. The properties of the Fourier transform are determined, in part, by the phases of the optical wavelets arriving at the Fourier transform plane (i.e., at the back focal plane of the transforming lens or lens system). Thus, by altering the phases of these wavelets as they emanate from the data mask, it is possible to manipulate the Fourier transform without (in principle) affecting the intensity distribution in the reconstructed image.

For example, U.S. Pat. No. 3,604,778, issued to C. B. Burckhardt on Sep. 14, 1971, describes the use of a phase mask to distribute the illumination more uniformly over the Fourier transform plane. This phase mask consists of an array of transparent elements. In use, the phase mask is juxtaposed with the data mask or, alternatively, it is projected back onto the data mask by some of the transforming lenses. One example of the latter arrangement is shown in FIG. 1. There, it is seen that lenses 15 and 20 project spatial light modulator 10 with unity (−1) magnification onto phase mask 70. It will be recalled that in the view of the figure, the phase mask lies one focal length to the left of lens 20, the spatial light modulator lies one focal length to the right of lens 15, and the separation between these lenses is equal to the sum of their respective focal lengths. The effect of this combination of lenses is to exactly image (upside down) spatial light modulator 10 onto phase mask 70.

Conventionally, the juxtaposition or projection is carried out such that each data element of the data mask lies adjacent to a corresponding element of the phase mask. Approximately one-half the elements of the phase mask, randomly selected, effect a 180° (π-radian) phase shift in the beam emerging from the corresponding data element. The other (approximately) one-half of the phase-mask elements do not effect a substantial phase shift.

When the phase of an array of light beams has been shifted by any phase mask, the resulting intensity distribution in the Fourier transform plane is modified by convolution of the corresponding electric field distribution with the Fourier transform of the phase mask. The effect of this in the present case is to add to the distribution broad-band noise, which randomizes phases of wavefronts that would otherwise reinforce each other through constructive interference at the dc spot.

The pattern shown in FIG. 2 is a schematic representation of the central portion of a Fourier transform. This Fourier transform results from a conventional combination of a data mask and a phase mask, each having square pixels. In the figure, brighter regions are represented by lighter shading.

Region 200 of this pattern is referred to as the central order of the Fourier transform. Relatively bright region 210, centrally located within region 200, represents the lowest spatial frequencies which, as noted, tend to contribute relatively high intensities to the pattern.

The actual size and spacing of the radial sequential orders (e.g., orders 200, 215, 220, respectively) that make up this pattern is dependent on the size and pitch (i.e., the center-to-center distance between pixels) of the pixel arrays, the amplitude and phase content of these arrays, the nature of the optical elements used, and the wavelength of the light used for illumination.

Although useful, this technique has been found disadvantageous because it results in an increase in the least acceptable size of the resulting hologram. That is, the size of the hologram is typically limited by masking the recording medium with an iris of suitable size and shape. The iris is juxtaposed with the recording medium or, alternatively, projected onto it by an imaging system that also relays the object beam onto the same medium. It is often desirable to confine the hologram in this manner, so that many such holograms can be recorded, side-by-side, or even partially overlapping, within the same medium. This makes it possible to economically store much more data than can be stored in a single hologram. The achievable amount of information that can be stored on a planar medium of a given area is inversely proportional to the square of the (linear) size of a single hologram. Thus, spreading the hologram by a factor $\alpha$ decreases the achievable information storage density by a factor $\alpha^2$.

As is well known, the image information stored in the hologram is globally distributed; that is, the complete image can be reconstructed from even a relatively, small part of the hologram. However, there are both theoretical and practical limits that dictate a lower bound to the area of the hologram from which an image can be reconstructed with a desired degree of fidelity to the original object. In applications. for data storage, the desired degree of fidelity is expressed by a desired maximum rate of bit error. That is, a data element having the logical value 1 should be reproduced as such in the reconstructed image, and similarly for a 0-valued element. The bit-error rate is the proportion of elements in the reconstructed image that bear the wrong logical value.

When methods are employed of the kind described in the Burckhardt patent, cited above, the smallest acceptable hologram is typically almost doubled in linear dimension relative to the case of a data mask without a phase mask.

In fact, the random binary phase mask disclosed in Burckhardt, as well as random n-valued phase masks disclosed by others (n an integer greater than 2), have been used for convenience, and not because they provide an optimal tradeoff between intensity redistribution and the size of the resulting hologram. Until now, practitioners have failed to show how such an optimal tradeoff can be achieved.

SUMMARY OF THE INVENTION

We have found certain constraints on the design of the phase mask that make it possible to redistribute illuminant intensity in the Fourier plane without incurring a severe penalty in the size of the resulting hologram. More specifically, we have found that this objective can be achieved when the phase mask, or other phase element, has a correlation length greater than the maximum side length of the pixels in the spatial light modulator (or other object). (Of course if the object is subdivided into identical square pixels, then the maximum side length is simply the common side length of these pixels.)

Significantly, the phase element need not be subdivided into pixels. An optic having continuous gradations of phase delay could be used, and in fact in certain embodiments, the phase element is a lens.

It should be noted that in a holographic system of the type described here, the phase element and the object are typically placed in effective juxtaposition. This effective juxtaposition may be achieved directly, by situating the phase element and the object near each other. Alternatively, the effective juxtaposition may be achieved projectively. That is, one or more lenses or other optical elements are readily used to juxtapose a (real or virtual) image of the phase element with the object (or an image thereof), or vice versa.

Accordingly, our invention involves apparatus for holographic recording of information. The apparatus includes a lens or lens system, referred to here as the "FT lens," situated in such a way that light from an object beam enters the FT lens after being modulated by (e.g., by passing through) an object, and light leaving the FT lens impinges on a recording medium situated at a Fourier transform plane of the object with respect to the FT lens.

In certain broad aspects of the invention, the apparatus includes a phase element effectively juxtaposed with the object, the phase element is effective for redistributing object-beam intensity in the Fourier transform plane, and the phase element has a correlation length greater than the maximum pixel side length.

We have also found that even when a phase element, as described above, is not added to the holographic system, certain advantages accrue if convergence or divergence is added to the object beam at some point (i.e., prior or posterior to the object) before the object beam enters the Fourier transform lens. (It will be recalled that the term "Fourier transform lens" is meant to encompass both individual lenses and lens systems.) Under at least some conditions, as will be explained below, one of these advantages is redistribution of illuminant intensity in the Fourier plane. A second advantage, under at least some conditions, is that the dc spot is shifted out of the Fourier transform plane. As will be described below, this shift makes possible further improvements in the diffraction efficiency of the resulting hologram.

Accordingly, in certain broad aspects of the invention, the apparatus includes an optical element or optical system, referred to here as a "power optic," that adds convergence or divergence to the object beam before the object beam enters the FT lens.

Generally, the power optic is effective even when it is not effectively juxtaposed with the object. Thus, there is broad discretion in the placement of the power optic within the optical system.

DETAILED DESCRIPTION

Basic theoretical and practical limitations dictate that the smallest recorded spot capable of providing an acceptable bit error rate has a diameter of approximately $2.2\lambda F/\Delta$, where F is the focal length of the transforming lens, $\lambda$ is the wavelength of the recording light, and $\Delta$ is the edge length of the SLM pixels (assuming, e.g., that the pixels are square). We have found that by appropriate design, it is possible to provide a phase mask (or other phase element) that will spread the dc spot without substantially spreading the rest of the relevant portion of the hologram. (It should be noted in this regard that what is typically recorded is the central order of the pattern in the Fourier transform plane, plus a small portion of the next order.) Thus, the intensity spike at the dc spot can be suppressed without incurring the need for a recorded spot substantially larger than the minimum size described above.

As noted, the addition of a phase mask to the optical system modifies the Fourier transform of the SLM (or other object) by convolving it with the Fourier transform of the phase mask. As is well known, convolving two distributions, which consists of folding them together in a mathematically defined way, creates a third distribution that in some sense blends the shapes of its progenitors. For example, the convolution of Gaussian distributions of widths $w_1$ and $w_2$ is a Gaussian distribution of width $w_3=\sqrt{w_2^2+w_2^2}$, which is greater than either $w_1$ or $w_2$.

Figure 1:
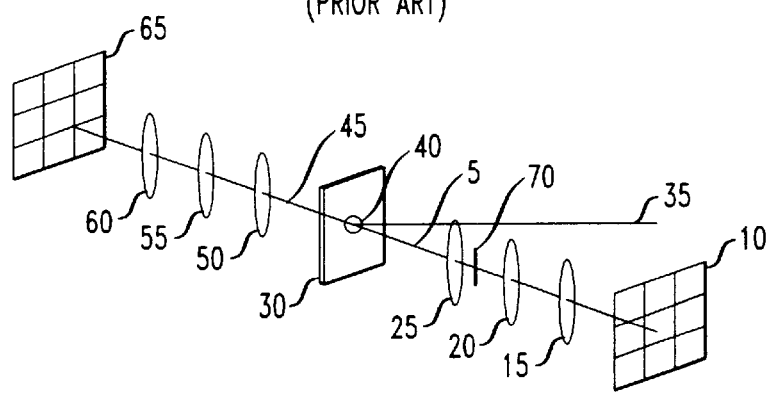
FIG. 1 is a schematic diagram of a holographic recording optical system of the prior art. The same system is useful in regard to the practice of the present invention, when, for example, a phase mask made in accordance with the invention is incorporated therein.
Figure 2:
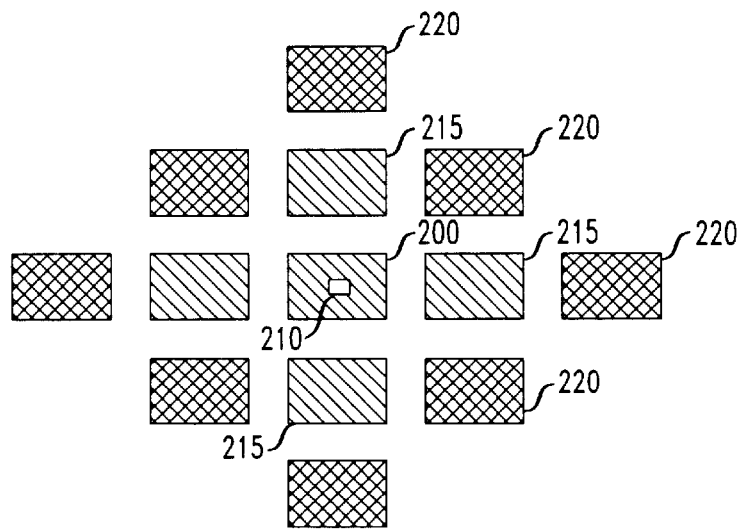
FIG. 2 is a schematic representation of the pattern produced in the Fourier transform plane of the system of FIG. 1 when an object having square pixels with random binary values is illuminated by an object beam and, a phase mask is not included in the system.

One advantageous property of a phase mask for the purposes described here is to have a Fourier transform that, through convolution, will spread the dc spot without substantially affecting the intensity distribution in the rest of the pattern. More specifically, referring to FIG. 2, central diffuse region 200 will typically have a width of about $2\lambda F/\Delta$. (Strictly speaking, this result is true only for certain SLM patterns, such as a random binary pattern. The assumption that the SLM pattern is random binary is useful for modeling purposes.) On the other hand, the width of dc spot 210 is typically about $\pi\lambda F/L$, where L is the total edge length of the SLM. This width is typically on the order of one micrometer. Thus, a useful phase mask is one whose Fourier transform is broader than dc spot 210, but not significantly broader than region 200.

Because the Fourier transform of the phase mask will not generally be Gaussian, there is some latitude in defining its width $W_\phi$. One useful measure of width is that diameter within which 80% of the illuminant intensity impinges on the holographic medium. (Those skilled in the art will appreciate that an alternative, but practically equivalent, measure of width is formulated in terms of the degree to which the spectrum of spatial frequencies in the phase mask is concentrated about zero.) In the case of rectangular pixel arrays, the term "diameter" should here be understood to mean the distance measured in each of the two principal directions of the Fourier transformed pattern.

The width $W_\phi$ is related to a characteristic quantity $\chi$, referred to as the correlation length of the phase mask, through the relation $W_\phi = \lambda F/\chi$. The greater the value of $\chi$, the more narrow will be the Fourier transform of the phase mask. Thus, a desirable phase mask is one having a correlation length of at least $\Delta$, and preferably greater than $\Delta$.

One way to achieve this is to make the pixels of the phase mask larger than the pixels of the SLM. According to our present belief, significantly improved results will be provided by a phase mask whose linear pixel dimensions are at least 1.5 times the corresponding pixel dimensions of the SLM. However, it is preferable for these mask dimensions to be no greater than 10 times the corresponding SLM dimensions, because beyond this range, there will be relatively little spreading of the central bright spot cast by the SLM in the Fourier transform plane.

Moreover, it is preferable for the length and width of the phase-mask pixels each to be an integral multiple of the corresponding dimension of the SLM pixels, such that registry is maintained between each phase-mask pixel and a corresponding sub-array of the SLM pixels. This is desirable because partial overlap between respective pixels of the SLM and phase mask can cause further, undesirable spreading of the combined Fourier transform.

As noted, the Fourier transform of the SLM generally consists of a dc spot and a diffuse pattern, which falls in a central order and successive higher orders arrayed about the central order. Because each recorded hologram typically includes only the central order and a small portion of the next order, it is helpful, for achieving the highest possible storage densities, to concentrate illuminant intensity insofar as possible in the central order at the expense of the higher orders.

Figure 3:
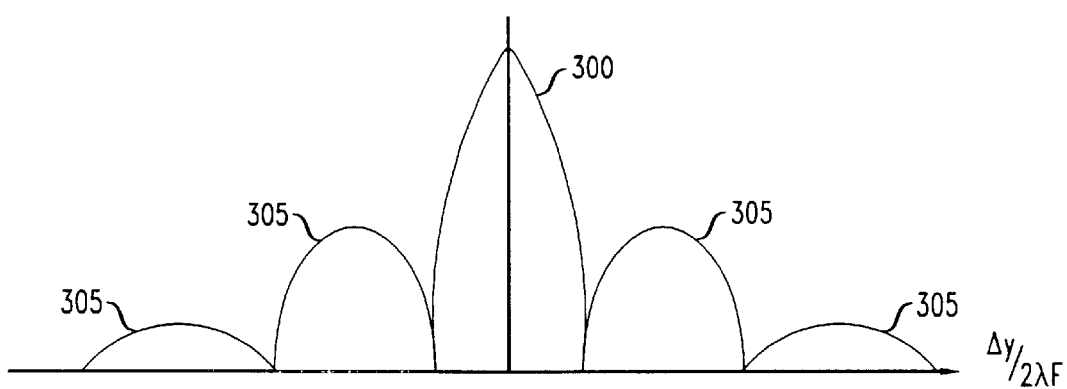
FIG. 3 is the intensity envelope of the pattern cast in the Fourier tranform plane by an illustrative random binary SLM pattern.

Those skilled in the art will recognize that this diffuse portion (at least in the case of a random binary SLM) is related to the sinc function $$\left(\frac{\lambda F}{\pi \Delta}\right)\left(\frac{1}{y}\right)\sin\left(\frac{\pi \Delta}{\lambda F}\right)y,$$

y, where y represents each lateral dimension in the Fourier transform plane. Specifically, the squared magnitude of this function, shown in FIG. 3, constitutes an envelope modulated by a speckle pattern. The peaks of the central lobe 300 and each side lobe 305 of this function (which actually extends in two dimensions although for convenience it is represented here in one dimension only) each correspond to the center of one of the diffuse spots of the central or higher order of the Fourier transform. The significance of pixel size in determining the widths of these spots is evident from the appearance of the parameter $\Delta$ in this expression.

If the phase mask is subdivided into pixels, the size 8 of these pixels is reflected in the Fourier transform of the phase mask. Thus, a random binary phase mask of pixel size $\delta$ has a Fourier transform proportional to $$\left(\frac{\lambda F}{\pi \delta}\right)\left(\frac{1}{y}\right)\sin\left(\frac{\pi \delta}{\lambda F}\right)y.$$

Thus, the Fourier transform of the phase mask has side lobes that, when convolved with the Fourier transform of the SLM, may tend to spread illuminant intensity beyond the central diffuse spot.

However, the side lobes can be at least partially suppressed, and thus this effect can be mitigated, by using phase-mask pixels that are smaller than the SLM pixels, while maintaining a correlation length of the phase mask that is at least $\Delta$, i.e., at least the side length of an SLM pixel. Significantly, this objective can be achieved only if there is some correlation among the pixels of the phase mask. That is, the phase mask cannot be entirely random, but must instead be partially random, or even wholly deterministic. As a general rule, improved performance will be achievable using phase masks in which the correlation length is at least twice the corresponding dimension of a single pixel.

Advantageously, the pixel size of such a mask is smaller than the pixel size of the SLM. In such a case, it is preferable for the sides of the mask pixels to be integral sub-multiples of the corresponding sides of the SLM pixels, in order to avoid the effects of pixel overlap mentioned above. Moreover, in such a case, the correlation length of the phase mask is preferably at least 1.5 times, but less than 10 times, the side length of the SLM pixels.

It should be noted in this regard that in place of a pixelated phase mask, it will often be advantageous to use a phase element that has no pixels at all, but instead has a continuously spatially varying value of the phase shift. A converging or diverging lens is an example of such a phase element. For example, a spherical lens of focal length $\pm f_0$ provides a phase shift (in radians) that varies continuously as $$\frac{x^2}{2\lambda f_0},$$

where x is the radial distance (transverse to the undeflected object beam) from the center of the lens.

The use of lenses as phase elements is discussed in greater detail below.

It should be noted further that even when the phase mask is subdivided into pixels, it will often be desirable to provide more than two possible values of the phase shift. Our studies have shown that in some cases, as many as 6, 8, or even more values, exemplarily uniformly spaced values from 0 to $\pi$, are advantageously used. Of course when masks are employed having more than two possible pixel values, the same limitations discussed above on pixel size and correlation length are still desirable.

It should also be noted that a mask or other element effective for the purposes described here may combine both amplitude-modulating and phase-modulating properties. We include such an element within our definition of phase element. One such example is provided by an apodized, or tapered, phase mask, in which the transmissivity of each separate pixel varies from a central maximum to a minimum at the edge. Such an amplitude-modulating pattern may contribute to the beneficial redistribution of illuminant intensity in the Fourier transform plane.

One way to provide a phase mask having reduced randomness is to apply an optimization procedure to an initially random mask, or to a mask having some initial degree of built-in determinacy.

According to an exemplary optimization procedure, the initial mask is (computationally) combined with a random binary (or other expected) SLM pattern, and the Fourier transform is calculated. A penalty is assigned to each selected undesirable feature of the Fourier transform, such as amplitude spikes and side lobes. The phase-shift values of the pixels are varied so as to minimize the total penalty score.

One example of an initial mask having some determinacy is a mask in which the phase-shift values are approximately distributed according to a Gaussian curve. In another example, contiguous groups of pixels are organized into clusters in a deterministic fashion. In these and other examples, the amount of determinacy can be reduced by applying well-known randomization procedures.

Another initial mask pattern may be made by creating a devised pattern in the Fourier-transform domain, such as non-zero values of unit amplitude and random phase within a specified (generally, circular or square) area. This pattern is then Fourier transformed, and the amplitude variations in the Fourier transformed pattern are suppressed so as to leave a pattern of phase shifts only. This pattern is useful because its Fourier transform is well localized; i.e., effectively confined to the originally specified area.

Figure 4:
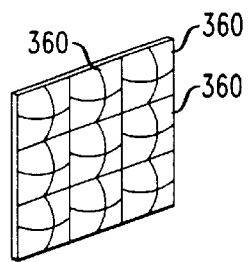
FIG. 4 is a simplified perspective view of an illustrative multi-lens array for use as a phase element.

As we have noted, above, a lens may advantageously serve as the phase element. Yet another form for the phase element, advantageous in at least some situations, is a multi-lens array, as shown in FIG. 4. If, for example, the SLM comprises square pixels, then to avoid edge effects, the array is also advantageously conformed such that each lens element, or lenslet, 360 is matched to a corresponding pixel, or sub-array of pixels, of the SLM.

Such a multi-lens array need not be effectively juxtaposed with the SLM. Therefore, there is broad discretion in the placement of this kind of phase element within the optical system.

Figure 5:
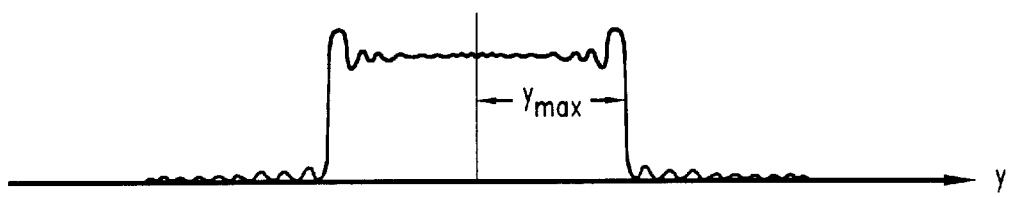
FIG. 5 is a graph of the squared magnitude of the Fourier transform of a spherical lens.

The phase delay $\phi(x)$ contributed by a spherical lens of focal length $f_0$ is given approximately by $$\phi(x) = \frac{x^2}{2\lambda f_0},$$

where x here represents the distance from the optical axis. The squared magnitude of the Fourier transform of a lens having this phase profile and edge length L is shown (in one dimension) in FIG. 5. The width $y_{max}$ of this distribution is given by $$y_{max} = \frac{LF}{f_0},$$

where, as noted, F is the focal length of the transforming lens, and $f_0$ is the focal length of the phase element, here referred to as the phase lens.

In practical terms, the effect of such a phase lens will be to spread the dc spot into a square region having an edge length of approximately $y_{max}$.

It should be noted in this regard that a similar effect may be obtained by interposing a converging or diverging lens in the object beam at any of a wide range of locations prior to the entry of the object beam into the transforming lens. More generally, such an effect may be obtained by interposing any of various optical elements or optical systems that add convergence or divergence to the object beam. We refer collectively to such elements and systems as "power optics." Typically, the dioptric power of elements useful as power optics will be 0.1 or more.

Figure 6:
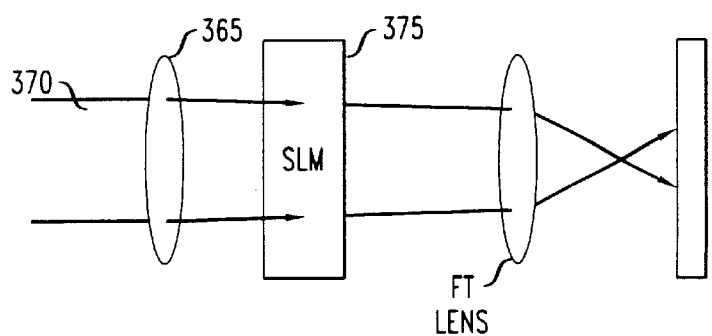
FIG. 6 is a simplified optical diagram showing the placement of a power optic according to the invention in certain embodiments.
Figure 7:
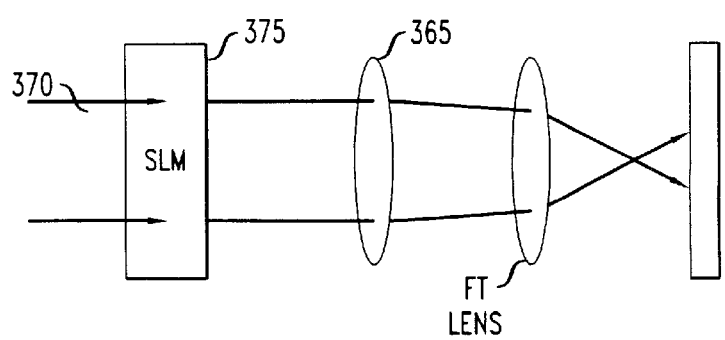
FIG. 7 is a simplified optical diagram showing an alternative placement of the power optic of FIG. 6.

In particular, power optic 365 may be situated in the path of object beam 370 at a position prior to object 375, as shown in FIG. 6, or at a position posterior to the object, as shown in FIG. 7. Certain other advantages that obtain when, e.g., lenses are used in this fashion are discussed below.

As noted above in reference to FIG. 3, the Fourier transform of the SLM is typically characterized by a sinc function that leads to a distribution of illuminant intensity having a central peak and multiple side lobes. The formation of these side lobes is related to the edge length $\Delta$ of the pixels that make up the SLM. A further useful function of a phase element is to suppress these side lobes, and thus to increase the concentration of illuminant intensity in the region, relatively near the axis, where the hologram will actually be recorded. A phase mask that is effective for spreading the dc spot is not necessarily also effective for achieving such an improvement in the intensity distribution.

We have found, however, that a phase mask comprising a multi-lens array can s both spread the dc spot and concentrate illuminant intensity by suppressing the side lobes in the Fourier transform plane that are due to the pixelation of the SLM.

Figure 8:
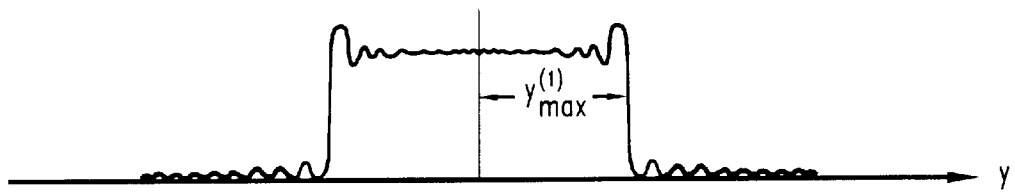
FIG. 8 shows, in simplified fashion, the envelope of the intensity distribution cast in the Fourier transform plane by the combination of a random binary SLM with a multi-lens array according to the invention in certain embodiments.

When a random binary SLM having square pixels of edge length $\Delta$ is combined with a multi-lens array of matching edge length (for each lenslet) and appropriate focal length, the resulting intensity pattern in the Fourier transform plane has a distribution having an envelope somewhat as shown in FIG. 8. The dc spot is broadened to extend over a substantial portion of the entire pattern, and the lobed pattern attributable to the SLM pixelation is substantially collapsed into a box of width $y_{max}^{(1)}$, given by $$y_{max}^{(1)} = \frac{\Delta \times F}{f_1},$$

where $f_1$ is the focal length of each lenslet. (This will be true at least for those cases in which $f_1$ and $\Delta$ are so chosen that $y_{max}^{(1)}$ is greater than the original—i.e., not modified by a phase element—width of the central peak of the sinc function.)

Figure 9:
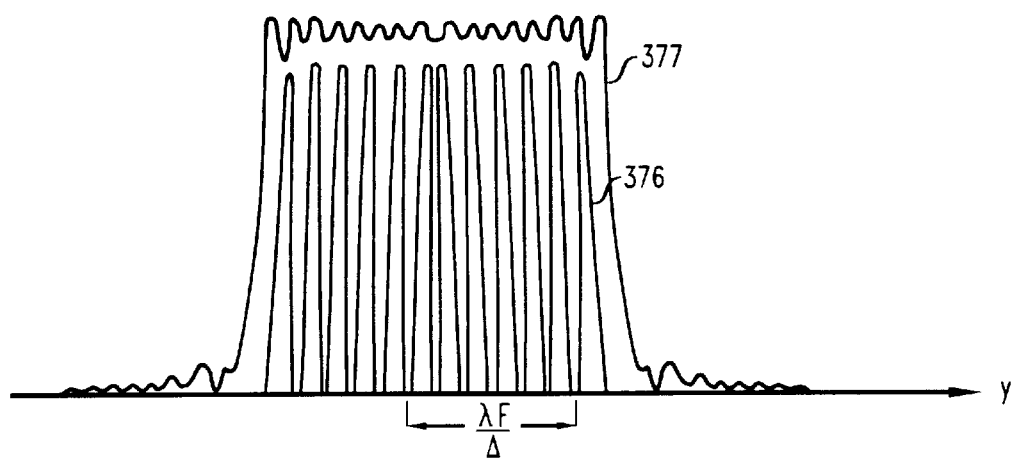
FIG. 9 shows the envelope of FIG. 8, together with a simplified view of a corresponding, speckle-modulated pattern. Indicated on the figure is a characteristic width for patterns obtained in the absence of a phase element.

One way to characterize the advantageous spreading of the dc spot by a lens or multi-lens array (or by other continuously varying phase elements) is illustrated in FIG. 9. To eliminate effects of speckle, the pattern 376 in the Fourier transform plane should be averaged over many (e.g., random binary) SLM patterns, such that an intensity envelope 377 is produced. As noted above, the central diffuse region of the pattern formed by a random binary SLM (without a phase element) extends to a radius of about $\lambda F/\Delta$. An advantageous degree of spreading is achieved if the first null of envelope 376 falls outside of this radius times 150%. According to one useful test, this condition is satisfied if in any direction within the stated range, the envelope falls to no less than 50% of its peak value.

It should be noted in this regard that apodization of the individual pixel amplitudes can also be effective for suppressing side lobes in the Fourier transform of a phase mask or other phase element.

Those skilled in the art will appreciate that the dc spot is the spot where the object beam would come to a focus in the Fourier transform plane, in the absence of any SLM or phase element. One effect of a converging or diverging phase lens or power element is to shift this focal point forward of (if converging) or behind (if diverging) the Fourier transform plane. (Thus, at least part of the spreading of the dc spot by such elements is due simply to geometrical projection.)

Figure 10:
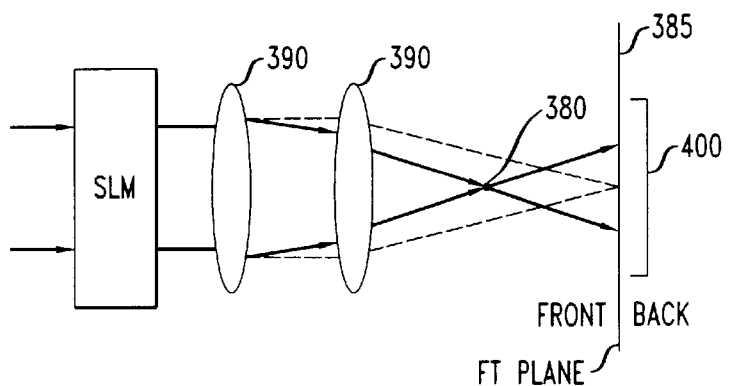
FIG. 10 is a simplified optical diagram illustrating the tendency of a converging power element to shift the dc focus to the front of the Fourier transform plane.
Figure 11:
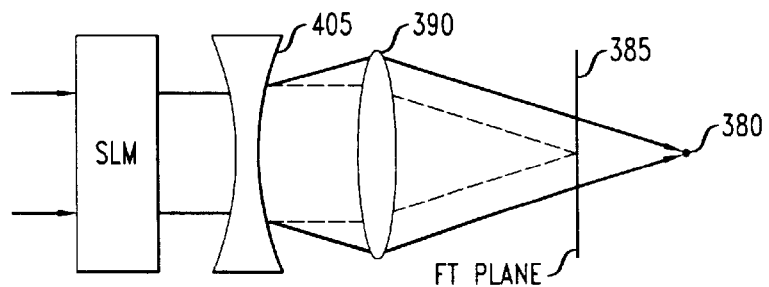
FIG. 11 is a simplified optical diagram illustrating the tendency of a diverging power element to shift the dc focus to the back of the Fourier transform plane.

We now discuss certain further advantages that may be obtained when such a shift is produced. In our discussion, we refer to the focal point described above as the "dc focus." The corresponding spot formed in the Fourier transform plane is referred to here as the "dc spot," irrespective of whether this spot has been spread by projection. Thus, FIG. 10 shows dc focus 380 formed in front of Fourier transform plane 385 by transforming lens 390 and converging power element 395, and corresponding projected dc spot 400. Similarly, FIG. 11 shows dc focus 380 formed behind the Fourier transform plane when power element 405 is diverging.

Those skilled in the art will appreciate that a holographic recording comprises numerous interference fringes embodied in the recording medium. The reconstruction of the hologram is effectuated when the excitation beam is diffracted by these fringes. The dimensionality of this fringe pattern is important, because changes in the spacings between fringes generally lead to changes in the resulting diffraction pattern. This, in turn, tends to corrupt the reconstructed image.

One problem often encountered in the field of holographic recording is shrinkage or expansion of the recording medium when it is cured or with changes in temperature. This shrinkage can change the dimensionality of the hologram, and thus corrupt the reconstructed image. This problem is particularly severe when the fringes lie in planes substantially parallel to the recording medium.

Figure 12:
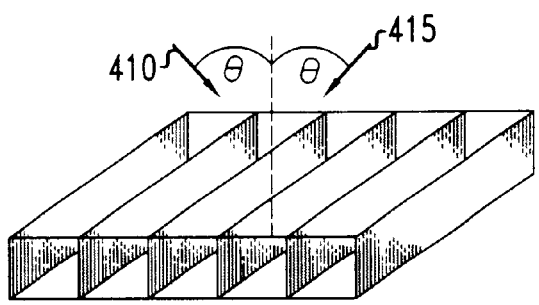
FIG. 12 is a schematic perspective diagram illustrating an illumination geometry that leads to the formation of interference fringes in planes substantially perpendicular to a recording medium.

One approach for mitigating this problem is to record with collimated (i.e., plane wave) object and reference beams incident in a so-called "transmission" geometry, in which both beams are incident from the same side of the recording medium with equal angles of incidence, as illustrated by object beam 410 and reference beam 415 of FIG. 12. In this geometry, the interference fringes tend to form in planes substantially perpendicular to the recording medium.

However, practitioners in the field have recognized that this geometry is not entirely satisfactory. Those rays of the object beam that converge to the dc spot account for a significant fraction of the exposure of the hologram. Because of the convergence of these rays, they are incident on the medium at a range of angles, not all equal to the angle of incidence of the reference beam. As a consequence the hologram remains, to some degree, sensitive to shrinkage.

Figure 13:
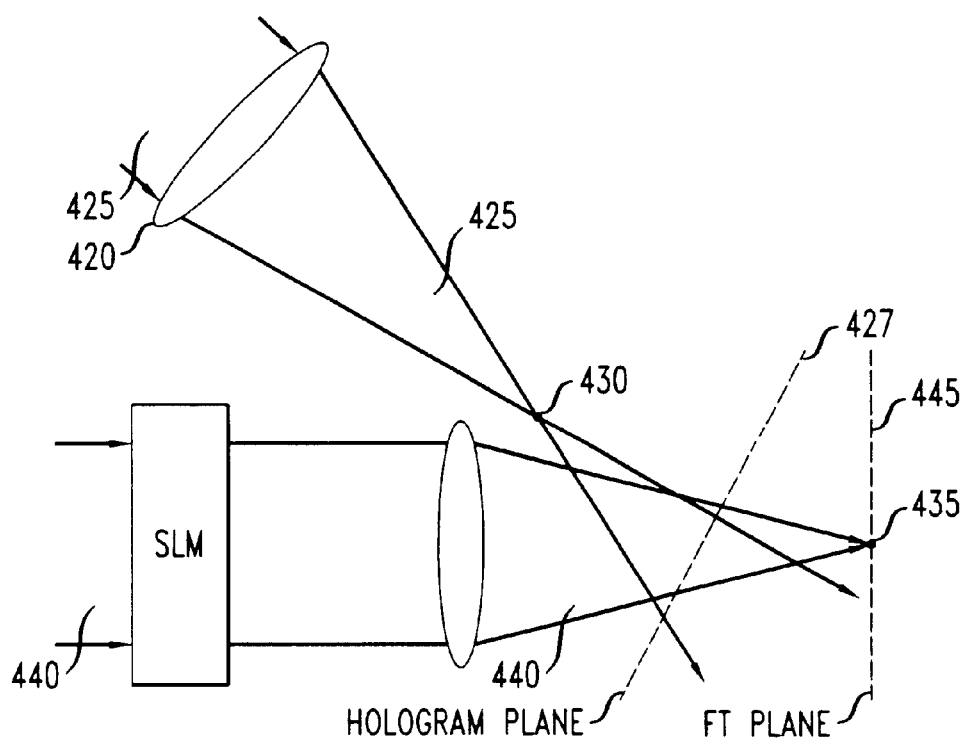
FIG. 13 is a simplified optical diagram illustrating a method of the prior art for making holograms that have reduced sensitivity to shrinkage of the recording medium.

One approach for mitigating this problem is described in Pu, Allen, "Holographic 3-D Disks and Optical Correlators Using Photopolymer Materials," Doctoral Dissertation, Demetri Psaltis, Thesis Advisor, California Institute of Technology, Pasadena, Calif., 1997 (Microform Ed., UMI, 300 N. Zeeb Road, Ann Arbor, Mich.), pages 119–123. According to this approach, which is illustrated in FIG. 13, lens 420 is interposed in reference beam 425, so that a cone of rays of the reference beam impinges on medium 427 as it converges toward, or diverges from, reference beam focal spot 430. Although a transmission geometry should be used, focal spot 435 of object beam 440 should be formed on the opposite side of the medium from the reference-beam focal spot. (Either of these focal spots may be chosen to fall on, e.g., the front side of the medium.) The respective focal spots should be approximately equidistant from the recording medium. The central axes of the cones of rays associated with the respective focal spots should have equal angles of incidence on the medium.

Although useful, this approach suffers from the drawback that the object-beam focal spot normally forms in Fourier transform plane 445. Therefore, in order to meet the condition that the respective focal spots are equidistant from the recording medium, it is necessary to shift the recording medium off of the Fourier transform plane (and toward the reference-beam focal spot). This is disadvantageous because it can lead (particularly for shifts greater than 0.5 mm in typical optical systems) to an increase in the size of the hologram, inhomogeneity in the intensity of the reconstructed image, and more sensitivity to shift of the hologram relative to the detector when the hologram is read. It can also increase the aberrations of the optical system.

Figure 14:
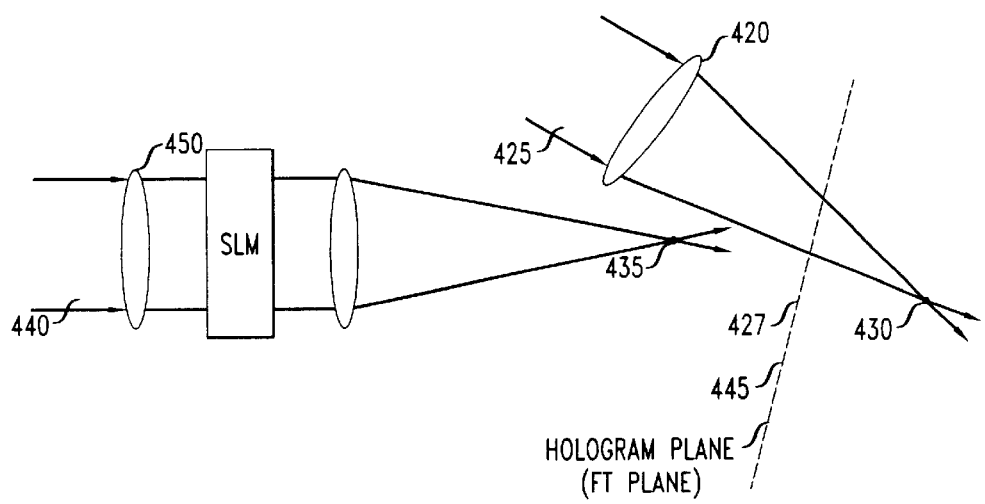
FIG. 14 is a simplified optical diagram illustrating a method, according to the invention in certain embodiments, for making holograms that have reduced sensitivity to shrinkage of the recording medium.

However, a further improvement can be obtained when a converging or diverging phase lens or power element 450 is added to the optical system, as described above and shown in FIG. 14. As noted, such an element will shift the object-beam focal point forward of (if converging) or behind (if diverging) Fourier transform plane 445. Thus, as shown in the figure, recording medium 427 can be placed in the Fourier transform plane while still enjoying the benefit of reduced sensitivity to shrinkage, and better optical system performance. As noted, either of respective focal spots 430 and 435 may be placed on a given side of the recording medium.

EXAMPLE

Figure 15:
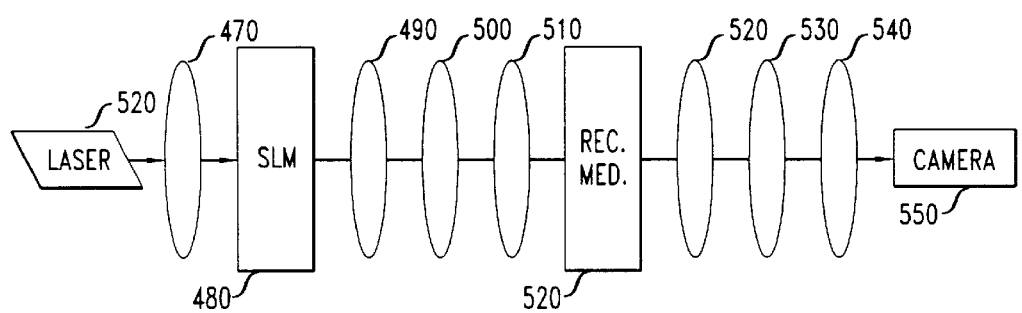
FIG. 15 is a schematic optical diagram of an exemplary optical system that embodies the invention in one of its aspects.

An exemplary optical system embodying the invention in a currently preferred aspect is depicted in FIG. 15. Downstream of laser light source 460 are optics (not shown) to expand and collimate the beam from source 460. Further downstream is power optic 470. Spaced 15 cm downstream of the power optic is SLM 480. The SLM is followed, in sequence, by 110.2-mm lens 490, 80-mm lens 500, and 45 mm lens 510. The last-named set of lenses, which together make up the Fourier transform lens system, are followed by holographic recording medium 520 in the Fourier transform plane of lens 510, as defined by plane wave illumination. For diagnostic purposes, medium 520 is followed by 45-mm lens 530, one-to-one imaging lens 540, and CCD camera 550.

When power optic 470 was implemented as a −500 mm lens, the dc spot and the ±1 orders of the Fourier transformed pattern were pushed 2–3 mm behind the Fourier transform plane.

When power optic 470 was implemented as a +1000-mm lens, the dc spot and the ±1 orders were pulled 1–2 mm in front of the Fourier transform plane.

The invention claimed is:

1. Apparatus for holographic recording of information, wherein:
   a) the apparatus comprises a lens or lens system, to be referred to as the FT lens, so situated that: light from an object beam enters the FT lens after being modulated by an object, and light leaving the FT lens impinges on a recording medium situated at a Fourier transform plane of the object with respect to the FT lens;
   b) the apparatus further comprises a phase element effectively juxtaposed with the object;
   c) the object is subdivided into pixels having a maximum center-to-center distance between adjacent pixels;
   d) the phase element is subdivided into pixels having a greater or smaller center-to-center distance than that between object pixels, as measured in at least one direction;
   e) the phase element has a correlation length greater than the maximum center-to-center distance between adjacent object pixels, and
   f) the phase element has a spatially varying pattern of phase modulation effective for at least partially redistributing illuminant intensity of the object beam in the Fourier transform plane.

2. The recording apparatus of claim 1, wherein each of the phase-element pixels provides a respective phase delay that is approximately constant over a face of said phase-element pixel extending substantially perpendicular to the object beam.

3. The recording apparatus of claim 2, wherein each said pixel of the phase element has a length and a width in respective mutually perpendicular facial directions, and said length and width are both greater than the maximum center-to-center distance between adjacent object pixels.

4. The recording apparatus of claim 1, wherein a length and a width of the phase-element pixels are at least 1.5 times, but not more than 10 times, a length and a width, respectively, of the object pixels.

5. The recording apparatus of claim 1, wherein the phase-element pixels have lengths and widths that are submultiples of object-pixel lengths and widths, respectively.

6. The recording apparatus of claim 5, wherein the phase element has a correlation length at least 1.5 times, but not more than 10 times, the maximum center-to-center distance between adjacent pixels.

7. The recording apparatus of claim 1, wherein the phase element incorporates an amplitude-modulating pattern.

8. The recording apparatus of claim 7, wherein the phase element pixels have variable transmissivity, and the transmissivity of each said pixel varies over said pixel.

9. Apparatus for holographic recording of information, wherein:
- a) the apparatus comprises a lens or lens system, to be referred to as the FT lens, so situated that: light from an object beam enters the FT lens after being modulated by an object having pixels, and light leaving the FT lens impinges on a recording medium situated at a Fourier transform plane of the object with respect to the FT lens;
- b) the apparatus further comprises a phase element effectively juxtaposed with the object and having a correlation length greater than a maximum side length of the object pixels;
- c) the phase element has a spatially varying pattern of phase modulation effective for at least partially redistributing illuminant intensity of the object beam in the Fourier transform plane; and
- d) the phase element has the property that when the FT lens has focal length F, the object beam has wavelength $\lambda$, and the object beam is modulated by a random binary spatial light modulator having pixels of length $\Delta$:
  - (i) there falls in the Fourier transform plane a redistributed intensity pattern having an intensity envelope and at least one principal direction; and
  - (ii) said envelope remains at no less than 50% of its peak value from the center of said pattern to a radius of $1.5 \times \lambda F/\Delta$ in any direction.

10. The recording apparatus of claim 9, wherein the phase element is configured to provide a phase delay that varies continuously across the object beam.

11. The recording apparatus of claim 9, wherein the phase element is a lens.

12. The recording apparatus of claim 9, wherein the phase-element is a converging lens.

13. The recording apparatus of claim 9, wherein the phase-element is a diverging lens.

14. The recording apparatus of claim 9, wherein the phase element comprises an array of multiple lenslets.

15. The recording apparatus of claim 14, wherein the lenslets are all converging with respect to the object beam, and said lenslets have a common focal length.

16. The recording apparatus of claim 14, wherein the lenslets are all diverging with respect to the object beam, and said lenslets have a common focal length.

17. A method for holographic recording of information using a Fourier transform lens or lens system, to be referred to as the FT lens, wherein an object beam, after it is modulated by an object subdivided into pixels having a maximum center-to-center distance between adjacent pixels and then passes through the FT lens, is combined with a reference beam on a recording medium situated at a Fourier transform plane of the object with respect to the FT lens, the method further comprising:

passing the object beam through a phase element effectively juxtaposed with the object, such that illuminant intensity of the object beam is redistributed in the Fourier transform plane by spatial variations of phase delay in the phase element, wherein the phase element is subdivided into pixels having a greater or smaller center-to-center distance than that between object pixels, as measured in at least one direction and has a correlation length greater than the maximum center-to-center distance between adjacent object pixels.

18. The recording method of claim 17, wherein said phase-element pixels are at least 1.5 times, but not more than 10 times, a length and a width, respectively, of the object pixels.

19. The recording method of claim 17, wherein the phase-element pixels have lengths and widths that are submultiples of object-pixel lengths and widths, respectively.

20. The recording method of claim 19, wherein the phase-element has a correlation length at least 1.5 times, but not more than 10 times, a maximum center-to-center distance between adjacent object pixels.

21. A method for holographic recording of information using a Fourier transform lens or lens system of focal length F, to be referred to as the FT lens, wherein an object beam of wavelength $\lambda$ is modulated by an object comprising an array of pixels of length $\Delta$ and then passed through the FT lens, and then combined with a reference beam on a recording medium situated at a Fourier transform plane of the object with respect to the FT lens, the method further comprising:

passing the object beam through a phase element effectively juxtaposed with the object and having a correlation length greater than the length $\Delta$, such that illuminant intensity of the object beam is redistributed in the Fourier transform plane by spatial variations of phase delay in the phase element, wherein the phase element has the property that when the object beam is modulated by a random binary pattern:
  - (i) there falls in the Fourier transform plane a redistributed intensity pattern having an intensity envelope and at least one principal direction; and
  - (ii) said envelope remains at no less than 50% of its peak value from the center of said redistributed intensity pattern to a radius of $1.5 \times \lambda F/\Delta$ in any direction.

22. The recording method of claim 21, wherein the phase element is configured to provide a phase delay that varies continuously across the object beam.

23. The recording method of claim 21, wherein the phase element through which the object beam is passed is a lens.

24. The recording method of claim 23, wherein the step of passing the object beam through a lens as a phase element adds divergence to the object beam.

25. The recording method of claim 23, wherein the step of passing the object beam through a lens as a phase element adds convergence to the object beam.

26. The recording method of claim 21, wherein the step of passing the object beam through a phase element comprises passing the object beam through an array of multiple lenslets.

* * * * *